Oct. 14, 1958     A. W. SCRUGGS     2,855,677
REPRODUCING MACHINE FOR PATTERNS OR IMAGES
Filed Oct. 25, 1954     5 Sheets-Sheet 1

FIG. 1.

FIG. 2. BEN HUR

FIG. 3. BEN HUR

FIG. 4. BEN HUR

FIG. 6. BEN HUR

FIG. 5. BEN HUR

INVENTOR.
ARTHUR W. SCRUGGS
BY
AGENT.

INVENTOR.
ARTHUR W. SCRUGGS
BY

AGENT.

INVENTOR.
ARTHUR W. SCRUGGS
BY
AGENT.

Oct. 14, 1958  A. W. SCRUGGS  2,855,677
REPRODUCING MACHINE FOR PATTERNS OR IMAGES
Filed Oct. 25, 1954  5 Sheets-Sheet 4

INVENTOR.
ARTHUR W. SCRUGGS
BY
Wm. H. Maxwell
AGENT

Oct. 14, 1958                A. W. SCRUGGS                2,855,677
REPRODUCING MACHINE FOR PATTERNS OR IMAGES
Filed Oct. 25, 1954                              5 Sheets-Sheet 5

INVENTOR.
ARTHUR W. SCRUGGS
BY
AGENT.

United States Patent Office 2,855,677
Patented Oct. 14, 1958

2,855,677

REPRODUCING MACHINE FOR PATTERNS OR IMAGES

Arthur W. Scruggs, Bloomington, Calif.

Application October 25, 1954, Serial No. 464,533

10 Claims. (Cl. 33—23)

This invention relates to a machine for reproducing patterns or images and it is a general object of this invention to provide a machine which serves to reproduce objects or images in a varied or modified form, for instance, varied as to height, varied as to width, varied as to vertical pitch and varied as to horizontal inclination.

The machine of the present invention is characterized by a standard that carries a table which supports a template or pattern with an image or markings thereon. A work carrying platform is adjustably supported by the standard and a frame-like housing is also carried by the standard and supports the mechanism of the machine.

It is an object of this invention to provide a reproducing machine for patterns or images that is easily and accurately adjustable to vary the height of an image being copied from a pattern or the like, so that when the tracing element of the machine follows the pattern the tool or cutting element of the machine moves on a varied scale relative to the heighth of the pattern.

Another object of this invention is to provide a reproducing machine that is easily and accurately adjustable to vary the width of an image being copied from a pattern so that when the tracing element of the machine follows the pattern, the tool or cutting element of the machine acts upon the work on a varied scale relative to the width of the pattern.

It is still another object of this invention to provide a reproducing machine that is easily and accurately adjustable to vary the vertical pitch of an image being copied from a pattern so that when the tracing element of the machine follows the pattern the tool or cutting element of the machine moves on a varied pitch relative to the vertical disposition of the pattern.

A further object of the invention is to provide a machine of the character referred to that is easily and accurately adjustable to vary the horizontal inclination of an image being copied from a pattern so that when the tracing element of the machine follows the pattern the tool or cutting element of the machine acts upon the work on a varied horizontal inclination relative to the horizontal disposition of the pattern.

It is still another object of this invention to provide a machine of the character referred to which is easily and accurately adjustable to accomplish singly any combination of, or all of, the above mentioned objectives simultaneously so that the shape and configuration of an image is transposed from a pattern to a piece of work with prescribed results.

A further object of the present invention is to provide a machine of the general character referred to which involves few simple accurately operating parts essential to the basic operation desired.

Another object of the invention is to provide a machine of the character referred to which is capable of convenient rapid modification so that its action may be varied in such a manner as to gain a wide range or variety of reproductions.

A further object of the invention is to provide a machine of the general character referred to in which the various working parts are of simple inexpensive construction, are readily accessible for adjustment, replacement or repair and are effective and accurate in operation.

The various objects and features of my invention will be fully understood from the following detailed description of typical preferred forms and applications of my invention, throughout which description reference is made to the accompanying drawings, in which:

Figs. 14 and 15 are enlarged detailed sectional views taken as indicated by lines 14—14 and 15—15 on Fig. 1. Fig. 16 is a detailed plan view of a portion of the structure taken as indicated by line 16—16 on Fig. 14. Fig. 17 is an enlarged detailed plan view of a portion of the structure taken as indicated by line 17—17 on Fig. 1, Figs. 18 and 19 are views showing a modified form of a portion of the machine of the invention, Fig. 18 being a view similar to Fig. 11, and Fig. 19 being a view taken as indicated by line 19—19 on Fig. 18.

In the form of the invention as illustrated throughout the drawings, the construction is such as to effect a true reproduction of a template or the like, on a predetermined scale such as a reduced scale relative to the template. In this form of the invention the mechanism may be set so that the reproduction is an accurate scale replica of the template as, for instance, a reproduction of the template in which the parts in the reproduction occur in the same shape as in the template. Adjustments are provided in the mechanism whereby variation or distortions may be gained in the reproduction so that the reproduction has the same figures or objects as the template, but these elements are in distorted or varied forms as to height, width, vertical pitch and horizontal inclination.

The reproducing machine of the present invention is adapted to cut or remove material from a piece of work while being controlled by a pattern or template and involves, generally, a standard A, a frame-like housing B mounted on the standard to be shiftable vertically thereon, a template table C carried by or related to the housing B, a work platform D carried on the standard to be shiftable vertically thereon relative to the housing B, work E carried on the platform D, a longitudinally shiftable carriage F carried by the housing B, a transversely shiftable carriage G carried by the housing B, a longitudinally shiftable slide S carried by the carriage G, a work cutting spindle or tool H carried by the slide S, a width varying means J adapted to engage and follow the configuration of the template and to drive the carriages F and G, heighth varying means K responsive to movement of the carriage F and adapted to drive the slide S, a vertical pitch varying means L adapted to modify action of the means J, a horizontal inclination varying means M adapted to modify action of the means K, and a drive means P for the work cutting spindle H.

The standard A is the main supporting structure of the machine and may be of any desired shape and construction. As shown, the standard A involves a base 10 and a column 11. The base 10 is a flat horizontal member engageable with the ground or supporting surface while the column 11 is a straight vertical member that projects upwardly from one end of the base 10. The column 11 is shown as a cylindrical part tubular in form and is provided with a vertically disposed rack 12 extending along the forward side thereof. The column 11 has a smooth exterior surface accurately finished for sliding engagement with the housing B and work platform D as hereinafter described.

The frame-like housing B is a rigid structure mounted on the standard A and may be shiftable vertically thereon. In the form of the invention shown the housing B involves a head 14 slidably carried on the exterior of the column 11, side members 15 carried by and projecting forwardly from the head 14, shifting means 16 and lock means 17. The head 14 extends transversely of the machine and has a central hub portion with a bore 18 slidably engaged with the exterior of the column 11. The rack 12 at the forward side of the column 11 is received in a guideway 19 in the hub portion of the head so that the head 14 of the housing B is keyed against rotation. The side members 15 occur at each side of the housing B and are spaced parallel vertically disposed plate-like parts that project forwardly from the head 14 and terminate at the front end of the housing. Suitable access openings 15′ may be provided in the housing as circumstances require. The head 14 and side members 15 are rigidly joined together and may be integral parts.

When the housing B is shiftable the shifting means 16 may be provided to move the housing B vertically of the standard A and involves a pinion 20 engageable with the rack 12, a shaft 21 driving the pinion 20 and a hand wheel 22 for operating the shaft 21. The pinion 20 and the shaft 21 are on an exis extending transversely of the housing B at the rear end thereof, and the hand wheel 22 is located at the exterior of the housing B adjacent one side member 15 thereof to be accessible to the operator of the machine.

When the housing B is shiftable lock means 17 is provided to stop and position the housing B vertically of the standard A and involves a suitable lever operated device, such as is common in machines of the type under consideration. That is, the hub portion of the head 14 may be split and a bolt 23 under control of a lever 24 may be operated to clamp the head 14 into tight engagement with the column 11 so that the housing B is locked in place on the standard A.

The template table C is a flat horizontally disposed part at the forward side of the machine and is easily and conveniently accessible to the operator. The template table C is shown carried by and projects forwardly from the side members 15 of the housing B and, in the form of the invention shown, the table extends transversely between the side members and has a flat top 25. The table C may be supported independently from the base 10, if so desired. The top 25 is adapted to carry a suitable template X, or the like, which template may be secured to the top 25 by means of suitable blocks 26 and held in transverse alignment by means of a guide 27. When the term "template" is used it is intended to include any object, subject, or material from which work is to be produced, and it may include written or printed matter, cuts, objects or art, and an infinite variety of such material. The table C may be shifted vertically of the housing B if so desired.

The work platform D is a rigid structure mounted on the standard and is preferably shiftable vertically thereon and underlies the housing B. Like the template table C the work platform D is a flat horizontally disposed part accessible from the front and sides of the machine. In the form of the invention illustrated the platform D involves a head 28 slidably carried on the exterior of the column 11, a work support 29, shifting means 30 and lock means 31. The head 28 has a central hub portion with a bore 34 slidably engaged with the exterior of the column 11. The rack 12 at the forward side of the column 11 is received in a guideway 35 in the hub portion of the head 28 so that the head of the work platform D is keyed against rotation. The shifting means 30 and lock means 31 may be identical to the equivalent means 16 and 17, respectively, as above described, in connection with the housing B. The work E to be acted upon by the machine of the present invention is shown as a plate or block 36 resting on the top 32 of the work platform D.

The machine of the present invention as shown is characterized by a pair of shiftable carriages F and G that move in response to the shifting of a stylus Y, or the like. The stylus Y is carried by a head 37 that is supported by the means J hereinafter described. In practice, the stylus Y may vary in size and form and construction depending upon the service being performed by the machine. In the particular case illustrated, a typical stylus Y is shown involving a guide 38 adjustable vertically in a head 37 and set in position by a set screw 39 to accommodate templates of varying thicknesses. Each carriage F and G is carried within the housing B to be shiftable in a horizontal plane, preferably so that one carriage overlies the other. In the case illustrated, the carriage F is uppermost and is shiftable longitudinally of the housing B while the carriage G underlies the carriage F and is shiftable transversely of the housing B.

The longitudinally shiftable carriage F is carried within the housing B at the top thereof and involves an elongate longitudinally disposed frame 40 substantially shorter in length than the housing B which frame is slidably carried on spaced parallel rails 41. The rails 41 in the case of the uppermost carriage F are pivotally carried by the housing B through a header 42 that extends transversely of the housing on a horizontal axis. Pinions connect the header 42 to the side members 15 of the housing as shown. The rails 41 may be cylindrical elements tubular in form and project forwardly from the header 42 and are supported at their forward ends by a spreader 42′ that receives the rails and has supporting engagement with the top of the housing B at the side members 15.

The frame 40 is slidable on the rails 41 and involves spaced parallel runners 44 engaged with the rails 41 and a flat horizontal platelike part 45 extending between and spacing the runners 44. The runners 44 and part 45 may be integrally formed and caps 46 overlie and are fastened to the runners 44 to confine the rails 41 so that the frame 40 is secured to the rails to be shiftable longitudinally of the housing B.

The transversely shiftable carriage G is carried within the housing B at the bottom thereof and involves an elongate transversely disposed frame 47 substantially shorter in length than the housing B is in width. The frame 47 is slidably carried on spaced parallel rails 48 which, in the case illustrated, are rigid with the housing B and extend across the housing between the side members 15. The rails 48 may be cylindrical elements tubular in form and are carried by the side members 15 on horizontal axes. The frame 47 is slidable on the rails 48 and invloves spaced parallel runners 49 engaged with the rails 48 and a flat horizontal part 50 that extends between and spaces the runners 49. In the form of the invention illustrated, the frame 47 is divided into upper and lower sections 51 and 52 so that the runners 49 can be assembled over the rails 48 to have sliding engagement therewith and so that the part 50 can be assembled over the slide S hereinafter described.

The machine thus far described is characterized by the housing B that slidably supports two freely shiftable carriages, one shiftable longitudinally of the housing and the other shiftable transversely of the housing. The machine further includes the slide S carried by one of the carriages F or G, and in the case illustrated, I have shown a slide S carried by the transversely shiftable carriage G.

The slide S is shiftable transversely of the carriage G and is an elongate element substantially shorter in length than the width of the carriage G so that it can be moved relative to the carriage. The slide S is adapted to be moved through motion of the stylus Y and is also adapted to carry the spindle H that carries a cutter or tool Z. The slide S involves a suitably shaped body 53 interposed between the sections 51 and 52 of the frame 47 of carriage G and a mount 54 for the spindle H. The body 53 is freely shiftable transversely of the carriage G or longitudinally of the housing B and anti-friction means 55 is provided between the body 53 and the sections 51 and 52. The means 55 may involve opposed grooves 56 and 57 in the sections 51 and 52, respectively, and grooves 58 and 59 in the body 53 which grooves align with and face the grooves 56 and 57. Suitable anti-friction balls 60, or the like, are carried in the grooves so that the body 53 is free to be shifted transversely of the carriage G and longitudinally of the housing B.

The mount 54 is carried by the body 53 to depend therefrom and carries the spindle H on a vertical axis. The mount 54 may vary widely in form and construction, that is, it may carry the spindle H at the side thereof so that the spindle can be of maximum vertical extent. However, I have illustrated a construction wherein the spindle H is carried centrally beneath the body 53, in which case the body 53 has spaced parallel side edges 61 that project from the frame 47 of the carriage G to which the spindle H may be fastened. As shown, a pair of arms 62 are fastened to the body 53 at the edges 61. The arms 62 project downwardly and are connected together by a mounting 63 preferably integral with the arms and extending between the lower ends thereof. The mounting 63 has a flat horizontally disposed face 64 adapted to receive the spindle H. It is to be understood that various mountings may be employed depending upon the type and configuration of the spindle to be mounted.

The work cutting spindle H may be any suitable tool carrying spindle of the type commonly employed in machines of the type under consideration and may be an anti-friction type device incorporating a vertical feed mechanism under control of a lever 65, and a collet or chuck 66. The spindle H is secured to the face 64 of the mounting 63 so that the tool or cutter Z is rotatable on a vertical axis and is shiftable vertically under control of the lever 65 into and out of engagement with the work E. When I refer to the machine as operating or as including a "tool" this term is to be understood as including any device, cutter, implement or object that may be used on work such as a sheet, plate, or body of material, to gain the desired action thereon or therein.

The present invention provides the means J, K, L and M for coupling the stylus Y to the spindle H and tool Z so that movement of the stylus Y is transmitted so as to move the spindle H and tool Z. It is a feature of this invention that movement of the stylus Y is varied with the result that the spindle H and tool Z operate on the work E to reproduce images, or the like, that are modified in form as compared with the pattern X which is followed by the stylus Y.

Figure 1:
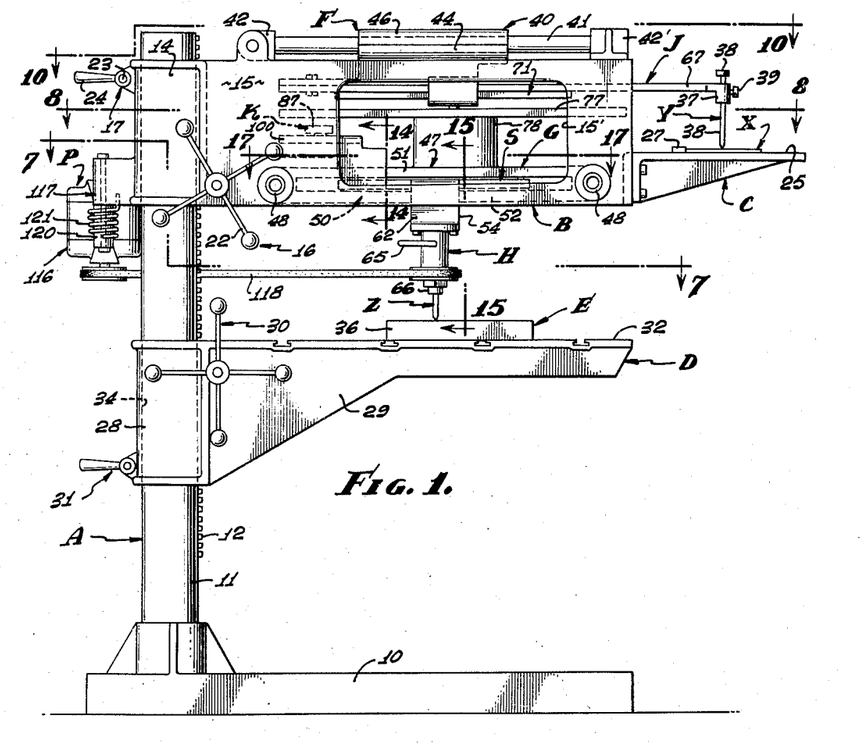
Fig. 1 is a side elevation of a machine embodying the present invention, showing it in operating condition.
Figure 2:
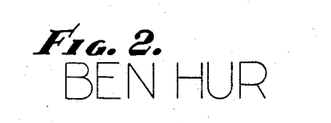
Figs. 2 to 6 are illustrations of a few of the many variations of an image that may be produced by the machine shown in Fig. 1 of the drawings, Fig. 2 being a view of a typical image as provided on a pattern or the like, Fig. 3 being a view of the image as shown in Fig. 2 after it has been varied as to width, Fig. 4 being a view of the image as shown in Fig. 2 after it has been varied as to height, Fig. 5 being a view of an image as shown in Fig. 2 after it has been varied as to height and vertical pitch and Fig. 6 being a view of an image as shown in Fig. 2 after it has been varied as to width and horizontal inclination.
Figure 3:
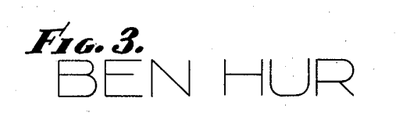

The width varying means J is adapted to engage and follow the configurations of the template X and to drive the carriages F and G and the slide S to effect a change in the width of the image reproduced on the work E as clearly illustrated in Fig. 3 of the drawings. The width varying means J involves, generally, a scale reducing arm 67 carried by the carriage F, a guide means 68 for the arm 67, a drive slot 69 on the carriage G, a shiftable drive pin 70 on the arm 67 and a coupling means 71 between the drive pin 70 and the drive slot 69.

The scale reducing arm 67 is pivotally and shiftably carried by the carriage F to swing from side to side in a horizontal plane so that the pin 70 is moved from side to side, and so that the carriage F is moved or shifted forward and backward. The scale reducing arm 67 is a straight elongate part rectangular in cross section and carries the head 37 at its forward end which head is driven by movement of the stylus Y. The rear end of the arm 67 is carried by a pivot member 72 that is slidably carried in a guideway 73 that extends longitudinally of the frame 40 of the carriage F. The member 72 may be a round disc shaped element carried by the two parallel walls which form the guideway 73. The guideway 73 is located at the rear end of the frame 40 so that the arm 67 may be of substantial length. The arm 67 is provided with scale markings 74 to indicate the proportionate reduction that takes place through action of the arm.

The guide means 68 is provided to control movement of the head 37 and stylus Y so that the stylus moves transversely in a straight line when the carriage F is motionless or held stationary. It will be readily understood that the guide means may be fashioned to guide the stylus so that the stylus follows any desired predetermined line. As shown, the guide means 68 involves a cam slot 75 and a follower 76. The cam slot 75 is arcuate and extends transversely of the frame 40 and projects laterally in opposite directions and curves forwardly as clearly shown in Fig. 10 of the drawings. As the stylus Y is moved to either side of the template table C, the follower 76 which may be a roler or the like acts to shift the pivot member 72 forwardly so that the stylus Y travels in a straight line.

Figure 8:
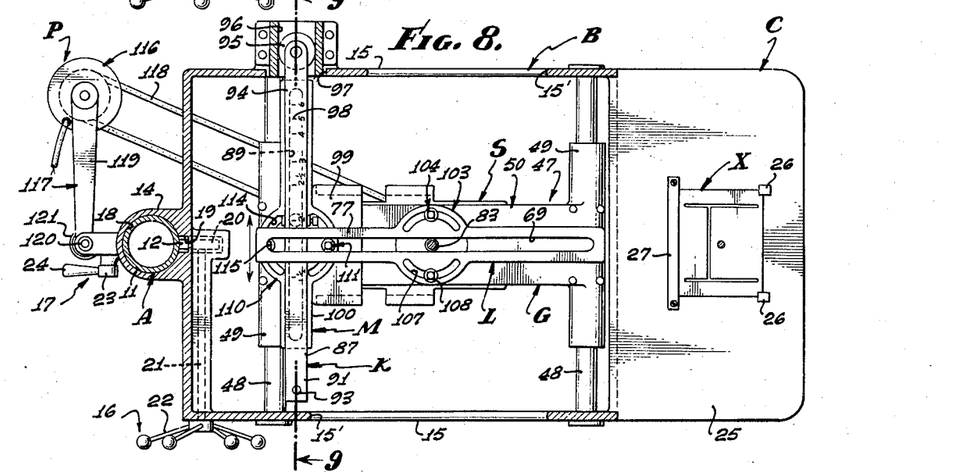
Fig. 8 is a sectional view taken as indicated by line 8—8 on Fig. 1.
Figures 10, 11, 12:
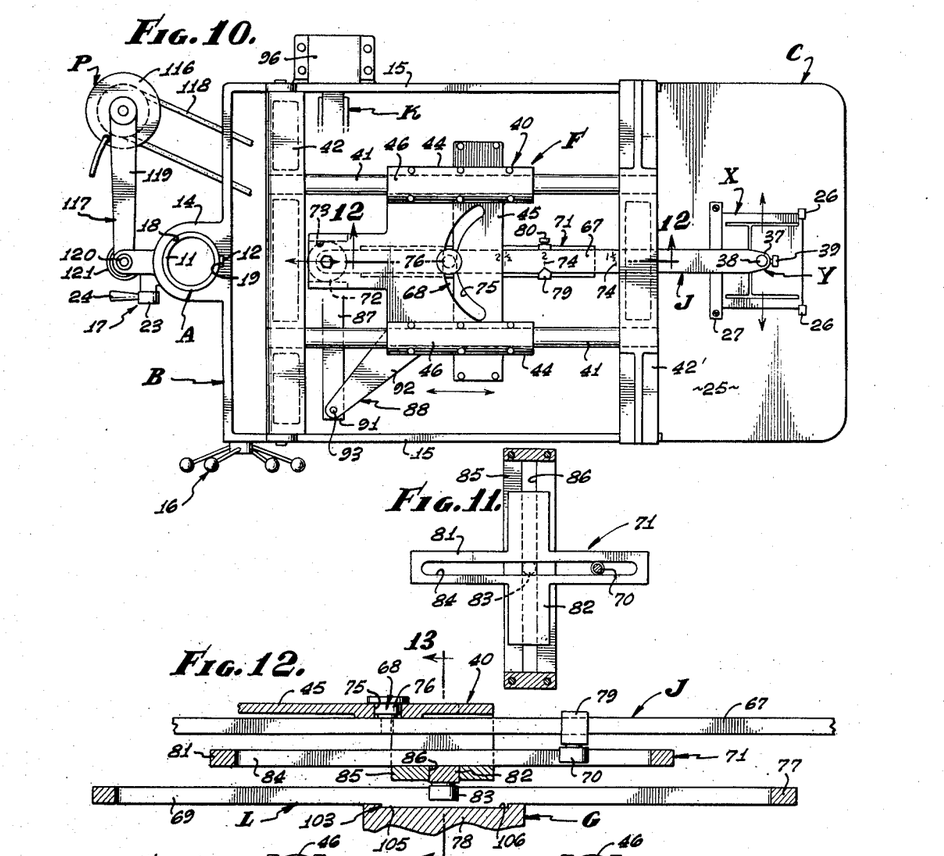
Fig. 10 is a plan view of the machine taken as indicated by line 10—10 on Fig. 1 of the drawings.
Fig. 11 is a view of a portion of the machine.
Fig. 12 is an enlarged detailed sectional view taken as indicated by line 12—12 on Fig. 10.
Figure 13:
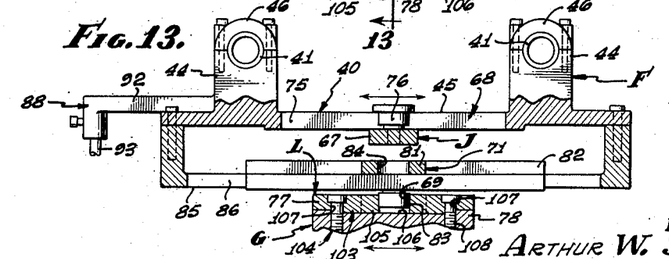
Fig. 13 is a sectional view taken as indicated by line 13—13 on Fig. 12.

The drive slot 69 is provided on the carriage G and is adapted to be engaged by a drive pin depending from the arms 67 to drive the carriage G transversely of the housing B. As best shown in Figs. 8, 12 and 13 of the drawings, the drive slot 69 is formed in a guide bar 77 that is carried on a bass 78 that projects upwardly from the frame 47 of the carriage G. The drive slot 69 is a simple elongate opening in the guide bar 77 having spaced parallel side walls engageable with a drive pin.

The shiftable drive pin 70 on the arm 67 is provided to drive the carriage G and may be directly engageable in the slot 69, if so desired. As shown, the drive pin 70 is carried by a clamp 79 and may be an anti-friction type roller pin or any equivalent construction. The clamp 79 is shiftable longitudinally of the arm 67 and may be secured in the desired position by a set screw 80 or any other suitable means.

The coupling means 71 is provided in the preferred form of the invention and operates between the drive pin 70 and the drive slot 69 to compensate for motions caused by the vertical pitch varying means L hereinafter described. The coupling means 71 involves a central longitudinally disposed intermediate guide bar 81 engageable with the drive pin 70, a transversely disposed driver 82 connected with the guide bar 81 and a secondary drive pin 83 engageable in the drive slot 69. The intermediate guide bar 81 has a driven slot 84 extending longitudinally thereof and of the structure, and is carried by the driver 82. The drive pin 70 that depends from the arm 67 operates in the slot 84 to shift the intermediate guide bar 81 from side to side.

The driver 82 is shiftably carried by the frame 40 of the carriage F to move freely transversely thereof and, as shown in Figs. 11 to 13, is carried by a support 85 that depends from and extends across the under side of the carriage F. The support 85 is provided with a guide opening 86 that extends transversely of the carriage F. The driver 82 is carried in the guide opening 86 so that it is free to travel from side to side and the secondary drive pin 83 is centrally carried by the driver 82 to depend therefrom into engagement with the drive slot 69 on the carriage G.

It will be apparent that when the stylus Y is moved from side to side the means J operates to drive the carriage G and spindle H and tool Z from side to side a reduced distance depending upon the position of the drive pin 70 along the arm 67.

Figure 4:
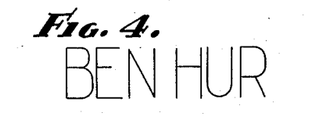
Figure 5:
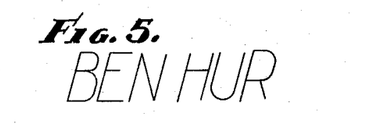
Figure 6:
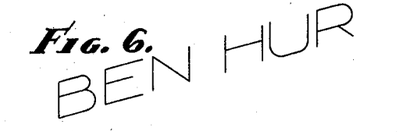

The height varying means K is adapted to engage and follow movement of the carriage F as the carriage is shifted by the width varying means J, and to drive the slide S to effect a change in the height of the image reproduced in the work E, as illustrated in Fig. 4 of the drawings. The height varying means K involves, generally, a scale reducing arm 87, a drive means 88 for the arm 87, a drive slot 89 on the slide M and a shiftable drive pin 90 on the arm 87. The means K may also include a coupling means 71' between the drive pin 90 and the drive slot 89 identical and equivalent to the coupling means 71 described in connection with the width varying means J. For simplicity of illustration I have not shown this means in connection with the preferred form of the invention and means K now under consideration.

The scale reducing arm 87 is pivotally and shiftably carried by the housing B to swing forward and backward in a horizontal plane so that the drive pin 90 is moved forward and backward and so that the slide S is moved or shifted forward and backward. The arm 87 is a straight elongate part rectangular in cross section and carries a head portion 91 at one end, which head portion is driven by movement of the carriage F. A leg 92 projects laterally of the carriage F and has a pin depending therefrom and releasably engaged in a bearing in the head portion 91 of the arm. A set screw may be provided to position the pin so that it is held in proper working engagement with the leg 92. The head portion 91 of the arm is adjacent one side of the housing B and the arm 87 extends across the housing so that the other end thereof is at the other side of the housing B. The said other end of the arm 87 may be termed the inner end 94 of the arm and is carried by a pivot member 95 that is slidably carried in a guide way 96 supported by the side member 15 of the housing B so that the arm extends transversely of the housing. The pivot member and guideway 96 may be identical to the pivot member 72 and guideway 73 above described. The guideway 96 is located at the exterior of the housing B and an opening 97 is provided in the housing so that the arm 87 may be of substantial length. The arm 87 is provided with scale markings 98 to indicate the proportionate reduction that takes place through action of the arm.

The drive means 88 for the arm 87 involves the leg 92 and pin 93 above described, which parts operate to drive and move the head portion 91 of the arm forward and backward in a straight line as will be apparent from Fig. 10 of the drawings.

Figure 9:
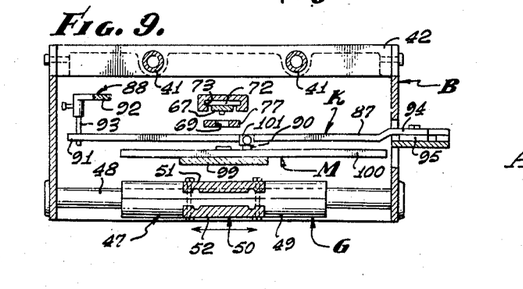
Fig. 9 is a transverse sectional view taken as indicated by line 9—9 on Fig. 8.
Figures 14, 15, 16, 17, 18, 19:
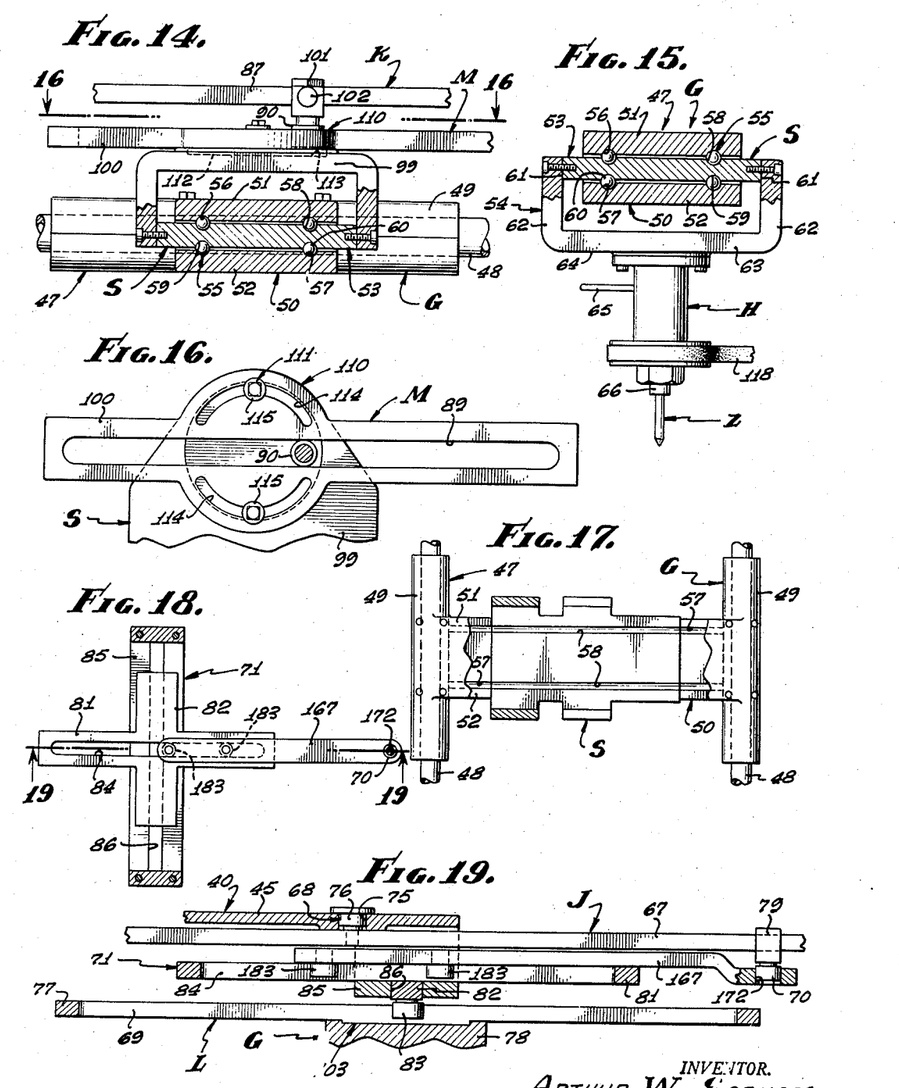

The drive slot 89 is provided on the slide S and is adapted to be engaged by the drive pin 90 depending from the arm 87 to drive the slide S forward and backward or longitudinally of the machine. As best shown in Figs. 9, 14 and 16 the drive slot 89 is formed in a guide bar 100 that is carried on a projection 99 that extends upwardly and rearwardly from the body of the slide S. The projection 99 may be mounted on the slide S in the same manner as the support 85 above described, which support is included in the mounting of the spindle H. The drive slot 89 is a simple elongate opening in the bar 100 having spaced parallel side walls engageable with the drive pin 90.

The shiftable drive pin 90 on the arm 87 is provided to drive the slide S and is shown engaged directly with the slot 89. As shown, the drive pin 90 is carried by a clamp 101 and may be an anti-friction type roller pin, or the like. The clamp 101 is shiftable longitudinally of the arm 87 and may be secured in the desired position by a set screw 102 or any other suitable means.

Figure 20:
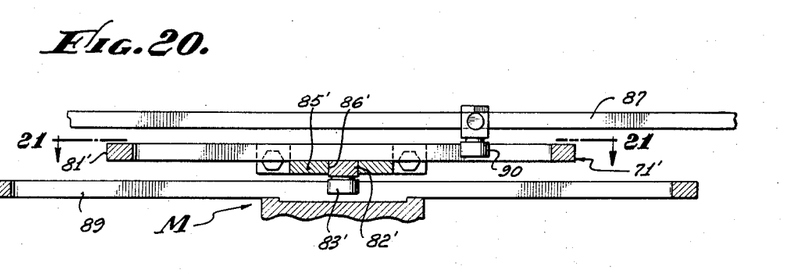
Fig. 20 is a view similar to Fig. 12 and showing a coupling means that I have provided.
Figure 21:
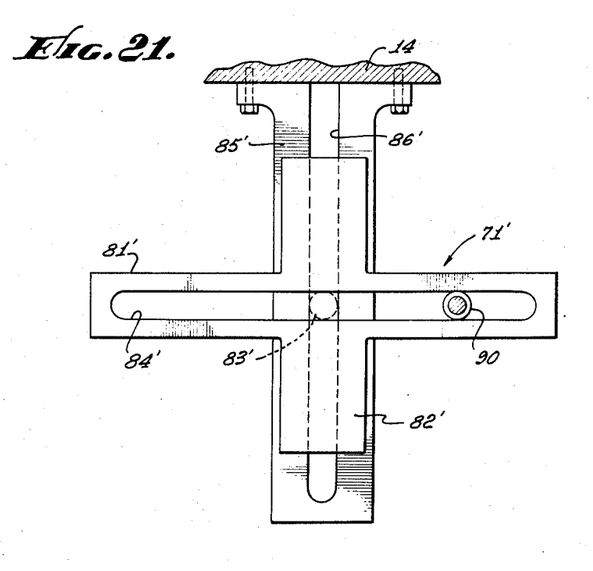
Fig. 21 is a sectional view of a portion of the structure taken as indicated by line 21—21 on Fig. 20.

As illustrated in Figs. 20 and 21 of the drawings, coupling means 71' may be provided to operate between the drive pin 90 and the drive slot 89 to compensate for motions caused by the horizontal pitch varying means M hereinafter described. The coupling means 71' involves a central longitudinally disposed intermediate guide bar 81' engageable with the drive pin 90, a transversely disposed driver 82' connected with the guide bar 81' and a secondary drive pin 83' engageable in the drive slot 89. The intermediate guide bar 81' has a driven slot 84' extending longitudinally thereof and transversely of the structure, and is carried by the driver 82'. The drive pin 90 that depends from the arm 87 operates in the slot 84' to shift the intermediate guide bar 81' back and forth.

The driver 82' is shiftably carried by the head 14 of the housing B to move freely longitudinally thereof and, as shown in Figs. 20 and 21, is carried by a support 85' that projects forwardly from the head 14 and extends across the under side of the arm 87. The support 85' is provided with a guide opening 86' that extends transversely of the arm 87. The driver 82' is carried in the guide opening 86' so that it is free to travel back and forth and the secondary drive pin 83' is centrally carried by the driver 82' to depend therefrom into engagement with the drive slot 89 on the slide S.

With the structure thus far described a complete and accurate reproducing machine is provided which is adapted to vary both the width and the heighth of the image separately or simultaneously in any desired proportion or amount of reduction as circumstances require. It will be apparent that when the stylus Y is moved forward and backward the arm 67 imparts movement to the upper carriage F through the guide means 68 while the heighth varying means K operates to drive the slide S, spindle H and tool Z forward and backward a reduced distance depending upon the position of the drive pin 90 along the arm 87.

The vertical pitch varying means L is provided in connection with the means J and is adapted to vary or modify the action of the means J to change the vertical disposition of the image reproduced in the work E. As shown, the pitch varying means L involves a pivotal support 103 for the bar 77 so that the drive slot 69 can be pitched or angularly related to the longitudinal axis of the machine, and a lock means 104 for positioning the support 103 to lock the bar 77 in the desired position.

The support 103 is best illustrated in Figs. 8, 12 and 13 of the drawings, and involves a bearing 105 at the center portion of the bar 77 which bearing is received in a recess 106 in the boss 78 that projects upwardly from the carriage G. The bearing 105 and recess 106 are preferably circular in form and act to center the bar 77 on a vertical axis and in a horizontal plane.

The lock means 104 involves arcuate slots 107 at the center portion of the bar 77, which slots are concentric with the vertical axis of the support 103, and lock bolts 108 or the like are provided to clamp the bar 77 in a fixed position on the boss 78. When the pitch varying means L is adjusted so that the bar 77 is positioned at an angle relative to the longitudinal axis of the machine, the action of the width varying means J is altered in order to change the vertical lines of the image reproduced in the work E.

The horizontal inclination means M is provided in connection with the means K and is adapted to vary or modify the action of the means K to change the horizontal disposition of the image reproduced in the work E. As shown, the inclination means M involves a pivotal support 110 for the bar 100 so that the drive slot 89 can be pitched or angularly related transversely of the axis of the machine, and a lock means 111 for positioning the support to lock the bar 100 in the desired position.

The support 110 is best illustrated in Figs. 8, 14 and 16 and involves a bearing 112 at the center portion of the bar 100, which bearing is received in a recess 113 in the projection 99 that extends rearwardly from the slide S. The bearing 112 and recess 113 are preferably circular in form and act to center and support the bar 100 on a vertical axis and in a horizontal plane.

The lock means 111 involves arcuate slots 114 at the center portion of the bar 100, which slots are concentric with the vertical axis of the support 110, and lock bolts 115, or the like, are provided to clamp the bar 100 in a fixed position on the projection 99. When the inclination means M is adjusted so that the bar 100 is positioned at an angle to a line that is transverse of or normal to the longitudinal axis of the machine, the action of the heighth varying means K is altered to change the horizontal lines in the image reproduced in the work E.

Figure 7:
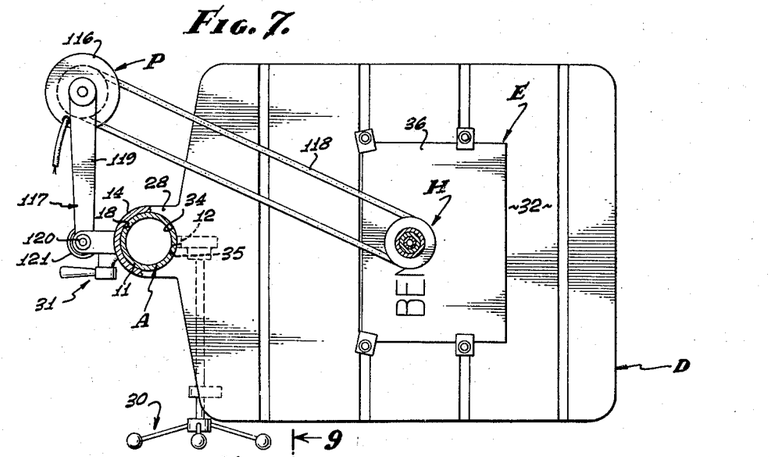
Fig. 7 is a sectional view taken as indicated by line 7—7 on Fig. 1.

The drive means P for the spindle H and tool Z is provided and may be a suitable drive such as commonly employed in machines of the type under consideration and, as shown, involves a prime mover 116, a shiftable mounting 117 for the prime mover, and a drive belt 118. The prime mover 116 may be a suitable electric motor, or the like, that is carried by the mounting 117, which mounting includes an arm 119 pivoted to the housing B at 120. A suitable spring 121 is provided to yieldingly urge the arm 119 outwardly as clearly shown in Figs. 7, 8 and 10 of the drawings. The belt 118 extends between a pulley on the prime mover 116 and a pulley on the spindle H so that a driving connection is provided between the motor and the tool Z. It will be apparent that as the spindle H and tool Z are moved longitudinally and transversely of the housing B, the spring 121 yieldingly urges the arm 119 away from the spindle H and tool Z so that the belt 118 is maintained under proper operating tension.

In Figs. 18 and 19 of the drawings I have illustrated a modified adaptation of the width varying means J which involves an extension arm 167 that is adapted to render the machine of the present invention effective for a greater variation in scale. From Figs. 8, 11 and 12 of the drawings, it will be apparent that the lengths of the bars 77 and 81 limit the action of the arm 67 to a reduction scale of about two to one. However, with the extension 167 the variation of the scale can be increased to one to one. As shown, the extension 167 is carried between the arm 67 and guide bar 81 and is shiftably carried by the guide bar 81 so that it extends longitudinally of the machine and projects beyond the forward end of the bars 77 and 81. Spaced guide pins 183 project downwardly from the rear portion of the extension to be engaged in the slot 84. The forward end portion of the extension is provided with an opening 172 adapted to receive the drive pin 70 so that motion imparted to the arm 67 is transmitted to the extension 167. With this construction and relationship of parts the clamp 79 and drive pin 70 can be moved to the forward end portion of the arm 67 and have driving engagement with the means 71 and the bar 77. An extension similar to the arm 167 may also be employed in connection with the arm 87 to increase the variation in scale of the arm 87.

Having described only typical preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. A machine of the character described including, an elongate frame-like housing, a template table at the forward side of the housing, a longitudinally shiftable carriage carried by the housing, a transversely shiftable carriage carried by the housing, a tool carrying slide carried by one of the carriages and shiftable transversely of the movement of said carriage, means with a stylus to follow the configuration of a template and shift the longitudinally shiftable carriage, and height varying means operated by movement of the other carriage and adapted to shift the slide relative to the said carriage on which it is mounted.

2. A machine of the character described including, an elongate frame-like housing, a template table at the forward side of the housing, rails extending longitudinally of the housing, a shiftable carriage slidably supported on said longitudinal rails, rails extending transversely of the housing, a shiftable carriage slidably supported on said transverse rails, a tool carrying slide shiftably carried by one of the carriages and movable transversely of the movement of said carriage, means with a stylus to follow the configuration of a template and shift the longitudinally shiftable carriage, and height varying means operated by movement of the other carriage and adapted to shift the slide relative to the said carriage on which it is mounted.

3. A machine of the character described including, an elongate frame-like housing, a template table at the forward side of the housing, rails extending longitudinally of the housing, a shiftable carriage slidably supported on said longitudinal rails, rails extending transversely of the housing, a shiftable carriage slidably supported on said transverse rails, a tool carrying slide shiftably carried by one of the carriages and movable transversely of the movement of said carriage, width varying means carried by the other carriage and with a stylus adapted to engage and follow the configurations of a template to shift the longitudinally shiftable carriage and to drive the transversely shiftable carriage, and height varying means operated by movement of the other carriage and adapted to shift the slide relative to the said carriage on which it is mounted.

4. A machine of the character described including, an elongate frame-like housing, a template table at the forward side of the housing, a longitudinally shiftable carriage carried by the housing, a transversely shiftable carriage carried by the housing, a slide carried by one of the carriages and shiftable transversely of the movement of said carriage, and width varying means carried by the other carriage and adapted to engage and follow the configuration of a template and drive the transversely shiftable carriage, comprising, a pivotally and shiftably mounted scale reducing arm projecting from the longitudinally shiftable carriage and with a head having a stylus engageable with the template, a guide means for the arm limiting the head and stylus to a predetermined transverse movement relative to the said longitudinally shiftable carriage, a drive slot in the transversely shiftable carriage, a drive pin on the arm and engageable in the slot, there being a clamp slidable longitudinally of the arm and carrying the drive pin.

5. A machine of the character described including, an elongate frame-like housing, a template table at the forward side of the housing, a longitudinally shiftable carriage carried by the housing, a transversely shiftable carriage carried by the housing, a slide carried by one of the carriages and shiftable transversely of the movement of said carriage, and width varying means caried by the other carriage and adapted to engage and follow the configuration of a template and drive the transversely shiftable carriage, comprising, a pivotally mounted scale reducing arm with a head having a stylus engageable with the template, a drive slot in the transversely shiftable carriage, a drive pin on the arm, and a coupling means between the pin and slot and having an intermediate bar with a slot, a driver shiftable transversely of the longitudinally shiftable carriage and carrying the intermediate bar, and a second drive pin carried by the driver and engageable in the slot in the transversely shiftable carriage.

6. A machine of the character described including, an elongate frame-like housing, a template table at the forward side of the housing, a longitudinally shiftable carriage carried by the housing, a transversely shiftable carriage carried by the housing, a tool carrying slide carried by one of the carriages and shiftable transversely of the movement of said carriage, means with a stylus to follow the configuration of a template and shift the longitudinally shiftable carriage, and height varying means operated by movement of the other carriage and adapted to shift the slide relative to the said carriage on which it is mounted, comprising a pivotally mounted scale reducing arm carried by the housing and with a head engaged with and driven by the longitudinally shiftable carriage.

7. A machine of the character described including, an elongate frame-like housing, a template table at the forward side of the housing, a longitudinally shiftable carriage carried by the housing, a transversely shiftable carriage carried by the housing, a tool carrying slide carried by one of the carriages and shiftable transversely of the movement of said carriage, means with a stylus to follow the configuration of a template and shift the longitudinally shiftable carriage, and height varying means operated by movement of the other carriage and adapted to shift the slide relative to the said carriage on which it is mounted, comprising, a pivotally and shiftably mounted scale reducing arm carried by and projecting from the housing and with a head engaged with and driven by the longitudinally shiftable carriage, a drive slot in the slide, a drive pin on the arm and engageable in the slot, there being a clamp slidable longitudinally of the arm and carrying the drive pin.

8. A machine of the character described including, an elongate frame-like housing, a template table at the forward side of the housing, a longitudinally shiftable carriage carried by the housing, a transversely shiftable carriage carried by the housing, a tool carrying slide carried by one of the carriages and shiftable transversely of the movement of said carriage, means with a stylus to follow the configuration of a template and shift the longitudinally shiftable carriage, and height varying means operated by movement of the other carriage and adapted to shift the slide relative to the said carriage on which it is mounted, comprising, a pivotally mounted scale reducing arm carried by the housing and with a head engaged with and driven by the longitudinally shiftable carriage, a drive slot in the slide, a drive pin on the arm, and a coupling means between the pin and slot and having an intermediate bar with a slot, a driver shiftable longitudinally of the housing and carrying the intermediate bar, and a second drive pin carried by the driver and engageable in the slot in the slide.

9. A machine of the character described including, an elongate frame-like housing, a template table at the forward side of the housing, rails extending longitudinally of the housing, a shiftable carriage slidably supported on said longitudinal rails, rails extending transversely of the housing, a shiftable carriage slidably supported on said transverse rails, a tool carrying slide shiftably carried by one of the carriages and movable transversely of the movement of said carriage, width varying means carried by the other carriage and with a stylus adapted to engage and follow the configuration of a template to shift the longtiudinally shiftable carriage and to drive the transversely shiftable carriage, comprising a pivotally mounted scale reducing arm with a head carrying the stylus to engage with the template, and a height varying means operated by movement of the other carriage and adapted to shift the slide relative to the said carriage on which it is mounted comprising a pivotally mounted scale reducing arm carried by the housing and with a head engaged with and driven by the longitudinally shiftable carriage.

10. A machine of the character described including, an elongate frame-like housing, a template table at the forward side of the housing, rails extending longitudinally of the housing, a shiftable carriage slidably supported on said longitudinal rails, rails extending transversely of the housing, a shiftable carriage slidably supported on said transverse rails, a slide shiftably carried by one of the carriages and movable transversely of the movement of said carriage, width varying means carried by the other carriage and adapted to engage and follow the configuration of a template and drive the transversely shiftable carriage, comprising, a pivotally and shiftably mounted scale reducing arm projecting from the longitudinally shiftable carriage and with a head having a stylus engageable with the template, a guide means for the arm limiting the head and stylus to a predetermined transverse movement relative to the longitudinally shiftable carriage, a drive slot in the transversely shiftable carriage, and a drive pin on the arm and engageable in the slot, there being a clamp slidable longitudinally of the arm and carrying the drive pin, and height varying means operated by movement of the longitudinally shiftable carriage and adapted to follow the configuration of the template and shift the slide relative to the said carriage on which it is mounted, comprising, a pivotally and shiftably mounted scale reducing arm shiftably carried by and projecting from the housing and with a head engaged with and driven by the longitudinally shiftable carriage, a drive slot in the slide, a drive pin on the arm and engageable in the slot, there being a clamp slidable longitudinally of the arm and carrying the drive pin.

References Cited in the file of this patent

UNITED STATES PATENTS

| 2,512,918 | Chamberlin | June 27, 1950 |
| 2,656,604 | Scruggs | Oct. 27, 1953 |

FOREIGN PATENTS

| 452,740 | Great Britain | Aug. 28, 1936 |
| 461,309 | Great Britain | Feb. 12, 1937 |